US011062244B2

(12) United States Patent
Botea et al.

(10) Patent No.: US 11,062,244 B2
(45) Date of Patent: Jul. 13, 2021

(54) SEATING SPACE OPTIMIZATION IN A GROUPED SEATING ENVIRONMENT

(71) Applicant: INTERNATIONAL BUSINESS MACHINES CORPORATION, Armonk, NY (US)

(72) Inventors: Adi I. Botea, Dublin (IE); Beat Buesser, Ashtown (IE); Akihiro Kishimoto, Castleknock (IE); Seshu Tirupathi, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 15/949,234

(22) Filed: Apr. 10, 2018

(65) Prior Publication Data
US 2019/0311311 A1   Oct. 10, 2019

(51) Int. Cl.
| | |
|---|---|
| *G06Q 10/06* | (2012.01) |
| *G06N 3/08* | (2006.01) |
| *G06F 3/0484* | (2013.01) |
| *G06F 3/0485* | (2013.01) |
| *G06F 40/00* | (2020.01) |
| *G06F 40/20* | (2020.01) |
| *B64D 11/06* | (2006.01) |
| *H04L 12/28* | (2006.01) |
| *B60N 2/01* | (2006.01) |
| *B60N 2/02* | (2006.01) |

(52) U.S. Cl.
CPC ... *G06Q 10/06315* (2013.01); *G06F 3/04842* (2013.01); *G06F 3/04847* (2013.01); *G06N 3/08* (2013.01); *B60N 2/01* (2013.01); *B60N 2/0296* (2013.01); *B64D 11/06* (2013.01); *G06F 3/04855* (2013.01); *G06F 40/00* (2020.01); *G06F 40/20* (2020.01); *H04L 12/2829* (2013.01)

(58) Field of Classification Search
CPC ............ G06Q 10/0635; G06F 3/04847; G06F 3/04842; G06F 40/00; G06F 40/20; G06F 3/04855; G06N 3/08; H04L 12/2829; B60N 2/0296; B60N 2/01; B64D 11/06
See application file for complete search history.

(56) References Cited

U.S. PATENT DOCUMENTS

| | | | |
|---|---|---|---|
| 8,805,710 B2 * | 8/2014 | Stirlen | G06Q 10/025 |
| | | | 705/1.1 |
| 9,302,774 B2 | 4/2016 | Henshaw | |
| 10,235,641 B2 * | 3/2019 | Godber | G06Q 30/06 |
| 2009/0063204 A1 * | 3/2009 | Stirlen | G06Q 10/02 |
| | | | 705/5 |

(Continued)

*Primary Examiner* — Matthew S Gart
*Assistant Examiner* — Stephen S Swartz
(74) *Attorney, Agent, or Firm* — Griffiths & Seaton PLLC

(57) ABSTRACT

Embodiments for optimizing seating space in a group seating arrangement by a processor. One or more seating preferences and constraints from a user may be received. An optimized seating arrangement in the group seating arrangement, having one or more adjustable seats, may be determined according to the one or more seating preferences and constraints. A user is enabled to select the optimized seating arrangement via a graphical user interface (GUI) such that the one or more adjustable seats in the group seating arrangement are dynamically adjusted according to the optimized seating arrangement and user selection.

20 Claims, 8 Drawing Sheets

(56) References Cited

U.S. PATENT DOCUMENTS

| | | | |
|---|---|---|---|
| 2009/0063208 A1* | 3/2009 | Stirlen | G06Q 10/02 705/6 |
| 2009/0273213 A1* | 11/2009 | Mukherjee | B64D 11/06395 297/217.3 |
| 2011/0010135 A1* | 1/2011 | Boin | B61D 1/04 703/1 |
| 2011/0258006 A1 | 10/2011 | Koetting et al. | |
| 2012/0010912 A1* | 1/2012 | Lele | G06Q 10/00 705/5 |
| 2012/0010913 A1* | 1/2012 | Lele | G06Q 10/02 705/5 |
| 2012/0016678 A1* | 1/2012 | Gruber | G10L 15/22 704/275 |
| 2012/0022901 A1 | 1/2012 | Nasr et al. | |
| 2013/0325526 A1* | 12/2013 | Tyler | G06Q 10/02 705/5 |
| 2014/0195277 A1* | 7/2014 | Kim | G06Q 10/02 705/5 |
| 2015/0100354 A1* | 4/2015 | Horowitz | G06Q 10/02 705/5 |
| 2015/0100943 A1* | 4/2015 | Gabel | G06Q 30/02 717/106 |
| 2016/0180017 A1* | 6/2016 | Savian | B64F 5/00 703/8 |
| 2016/0232468 A1* | 8/2016 | Meiri | G06Q 10/06315 |
| 2017/0285642 A1* | 10/2017 | Rander | B60N 2/0244 |
| 2017/0372551 A1* | 12/2017 | Bruce | G07C 9/00571 |
| 2018/0312258 A1* | 11/2018 | Itzinger | B64D 11/06 |

\* cited by examiner

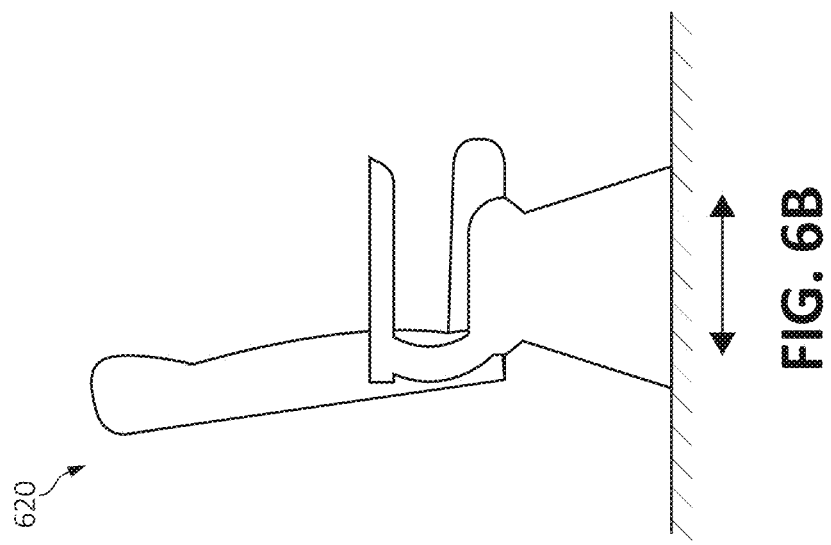
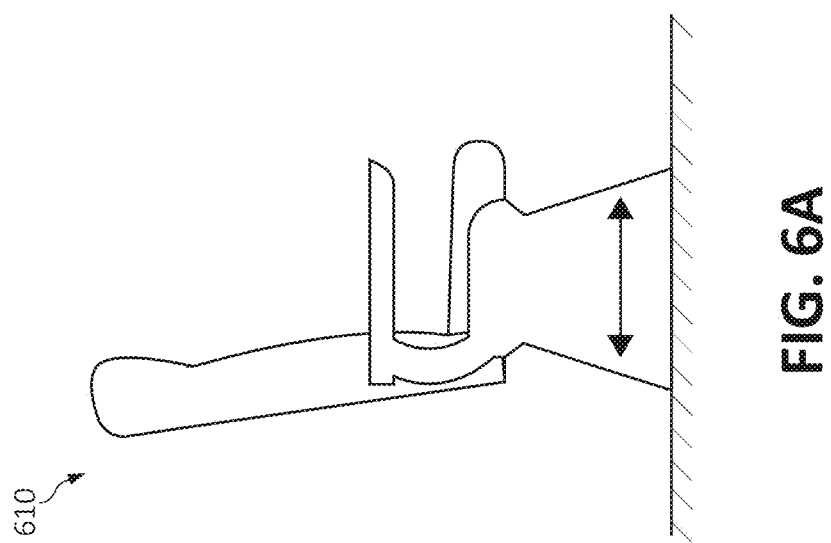

SEATING SPACE OPTIMIZATION IN A GROUPED SEATING ENVIRONMENT

BACKGROUND OF THE INVENTION

Field of the Invention

The present invention relates in general to computing systems, and more particularly, to various embodiments for optimizing seating space in a group seating arrangement in a moving or stationary object using one or more processors in a computing environment.

Description of the Related Art

As the increase in demand continues to rise for public or private transportation, entertainment venues, conference centers, or other objects that provide seating for passengers and patrons, seating availability and seating arrangements also continue to increase. Attendant with the proliferation of providing seating to multiple parties have been certain negative impacts associated with being an occupant in a moving or stationary object (e.g., an aircraft or theater). One of these negative impacts is the challenge to accommodate the various physical sizes of each party so as to provide maximum and optimal comfort and seating enjoyment from the effects of a group seating environment. As great strides and advances in technology and design of moving and stationary objects come to fruition, addressing seating availability and comfort is a major challenge.

SUMMARY OF THE INVENTION

Various embodiments for optimizing seating space in a group seating arrangement in a moving or stationary object are provided. In one embodiment, by way of example only, a method for optimizing seating space in a group seating arrangement, again by a processor, is provided. An optimized seating arrangement in the group seating arrangement, having one or more adjustable seats, may be determined according to the one or more seating preferences and constraints. A user is enabled to select the optimized seating arrangement via a graphical user interface (GUI) such that the one or more adjustable seats in the group seating arrangement are dynamically adjusted according to the optimized seating arrangement and user selection.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6A is a diagram depicting an anticipated/actual motion of an adjustable seating surface of a seat in accordance with aspects of the present invention;

FIG. 6B is a diagram depicting an anticipated/actual motion of an adjustable seat in accordance with aspects of the present invention;

DETAILED DESCRIPTION OF THE DRAWINGS

Figure 1:
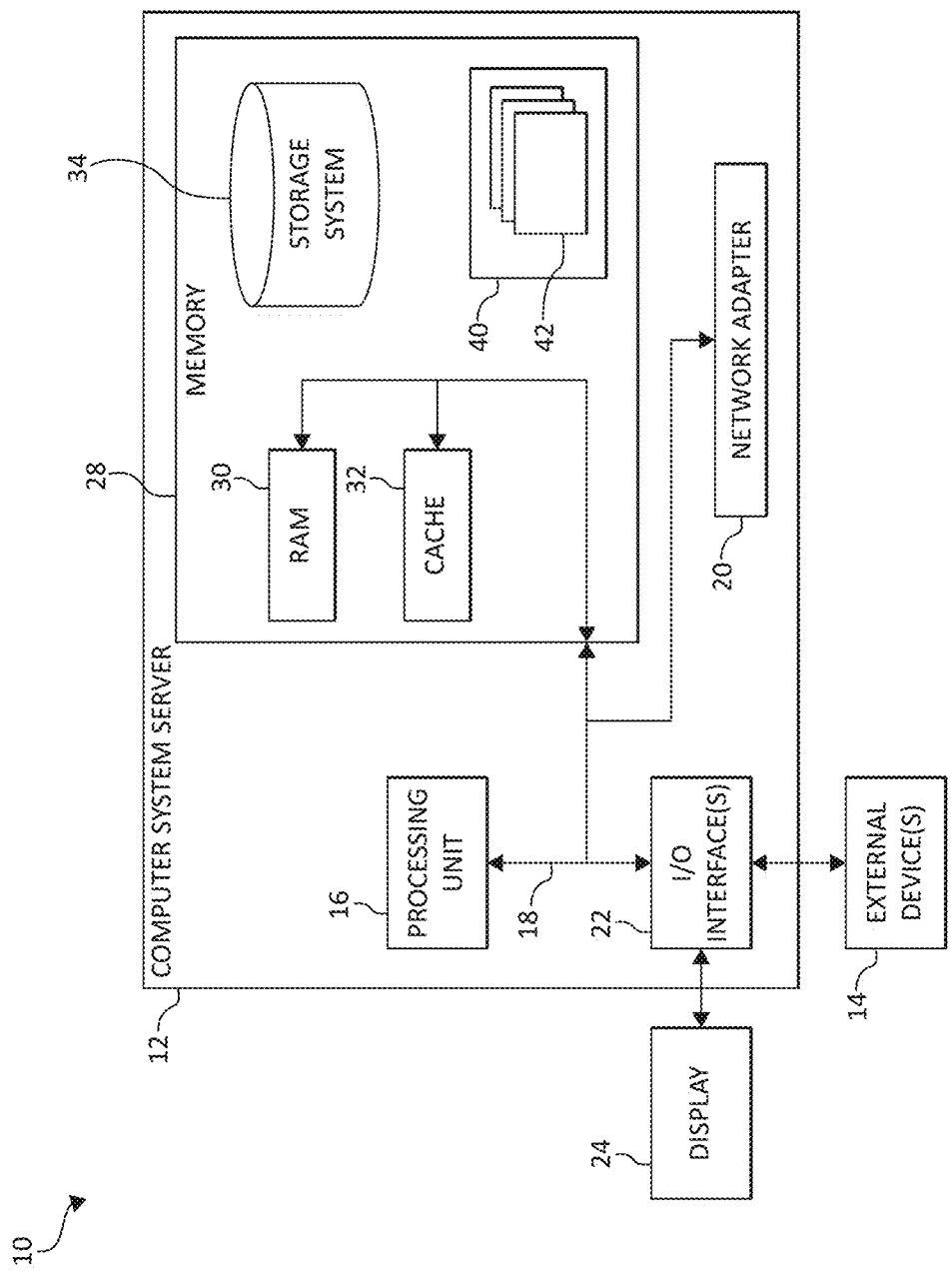
FIG. 1 is a block diagram depicting an exemplary computing node according to an embodiment of the present invention.

As previously indicated, use of moving or stationary objects providing group seating encounter challenges in addressing the comfort and availability of seating. The various physical differences between each passenger in an aircraft, train, boat, and the like, may compromise the comfort and enjoyment of travel for some passengers. For example, many air travelers place a premium on having sufficient legroom and such persons may be willing to pay for the extra leg space. Many of these moving or stationary objects only provide fixed seating options with limited adjustable options such as, for example, seating with only the capability to adjust the seat pitch. Strides have been made to attempt to enable some seats to adjust in one or more directions via one or more mechanical features to provide greater seating comfort. However, a need exists to optimize seating users in an optimized way in both moving or stationary objects providing a group seating environment such as, for example, an aircraft, a bus, and a theater/cinema, given that the available space (e.g., "leg room") can be dynamically adjusted in one or more directions.

Accordingly, various embodiments of the present invention provide for optimizing seating space in a group seating arrangement in moving and/or stationary objects that provide seating for more than one user by a processor. An optimized seating arrangement in the group seating arrangement, having one or more adjustable seats, may be determined according to the one or more seating preferences and constraints. A user is enabled to select the optimized seating arrangement via a graphical user interface (GUI) such that the one or more adjustable seats in the group seating arrangement are dynamically adjusted according to the optimized seating arrangement and user selection. The optimized seating arrangement provides dynamic pricing based on seat category, seat compartments, seat spacing, or other selected preferences and constraints.

In an additional aspect, mechanisms of the present invention use various means as will be further described to perform what will be termed herein as "seating space optimization," or optimizing seating space in a group seating environment by dynamically offering a user to select an adjustable seat according to one or more seating preferences and constraints. The seating space optimization process may take into account data from a variety of stored and real time sources, such as maps, mobile or stationary object seating designs (e.g., an airplane or theaters seating arrangement), historical data, pricing relating to one or more preferences and constraints, and data gathered from the user from various integrated computing systems, among other sources.

In an additional aspect, the present invention provides for optimizing seating amongst users in a group seating environment where spacing around an adjustable seat (e.g., leg room) can be adjusted dynamically by sliding seats and seat pitches in one or more directions (e.g., backwards, forwards, laterally, etc.). In one aspect, an interactive graphical user interface ("GUI") is provided to a user to interact with a seating optimization system to select and secure one or more seating configurations that maximize or minimize seating space according to one or more preferences and/or constraints. The user is enabled to secure a seating space seating arrangement that is optimized according to the one or more preferences and/or constraints. For example, the user may be able to purchase, sell, or trade a selected amount of leg room illustrated in an optimized seating arrangement according to the preferences and constraints at the time of purchasing a ticket (e.g., an airline ticket, movie ticket, music concert ticket, etc.). The optimization of seat assignment and seating space for each user may include determining one or more preferences and constraints for one or more users.

In one aspect, the preferences and constraints may include health issues and considerations (e.g., restless leg syndrome), physical dimensions of a user (e.g., height and weight), financial constraints of a user (e.g., a maximum or minimum threshold amount a user will spend on a ticket providing more or less seating space), ticket costs, requirements for one or more family members to sit together, and preference and willingness of a user to buy or sell additional seating space (e.g., extra leg room). The preferences and constraints may include assigning a dynamically adjustable seat to a user, having purchased a seat having more seating space compared to other seats, to a seat having an increased amount of seating space (e.g., increased leg room). The preferences and constraints may also include assigning a dynamically adjustable seat to a user, having sold a seat having more seating space compared to other seats, to a seat having a decreased amount of seating space (e.g., reduced leg room). Furthermore, the preferences and constraints may also include physical dimensions of each seat, a seating style or arrangement in a mobile or stationary object or structure, movement and adjustment capabilities of each seat, and categories or classifications of seating (e.g., first class seats in an airline, business class seating, general seating class, etc.). The preferences and constraints may also include a selected location or preference of a seat in relation to other interests or preferences (e.g., an aisle seat, a window seat, a seat having greater proximity to an exit or restroom facility, etc.).

The present invention may determine (e.g., compute) an optimized seat assignment based on the preferences and constraints. The optimization technology may interface with, or piggyback on, a ticket purchasing application. The optimization technology enables a user to select one or more options for buying, selling, or trading a selected amount of increased or decreased seating space in a group seating arrangement using one or more adjustable seats capable of one or more directions of movement.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
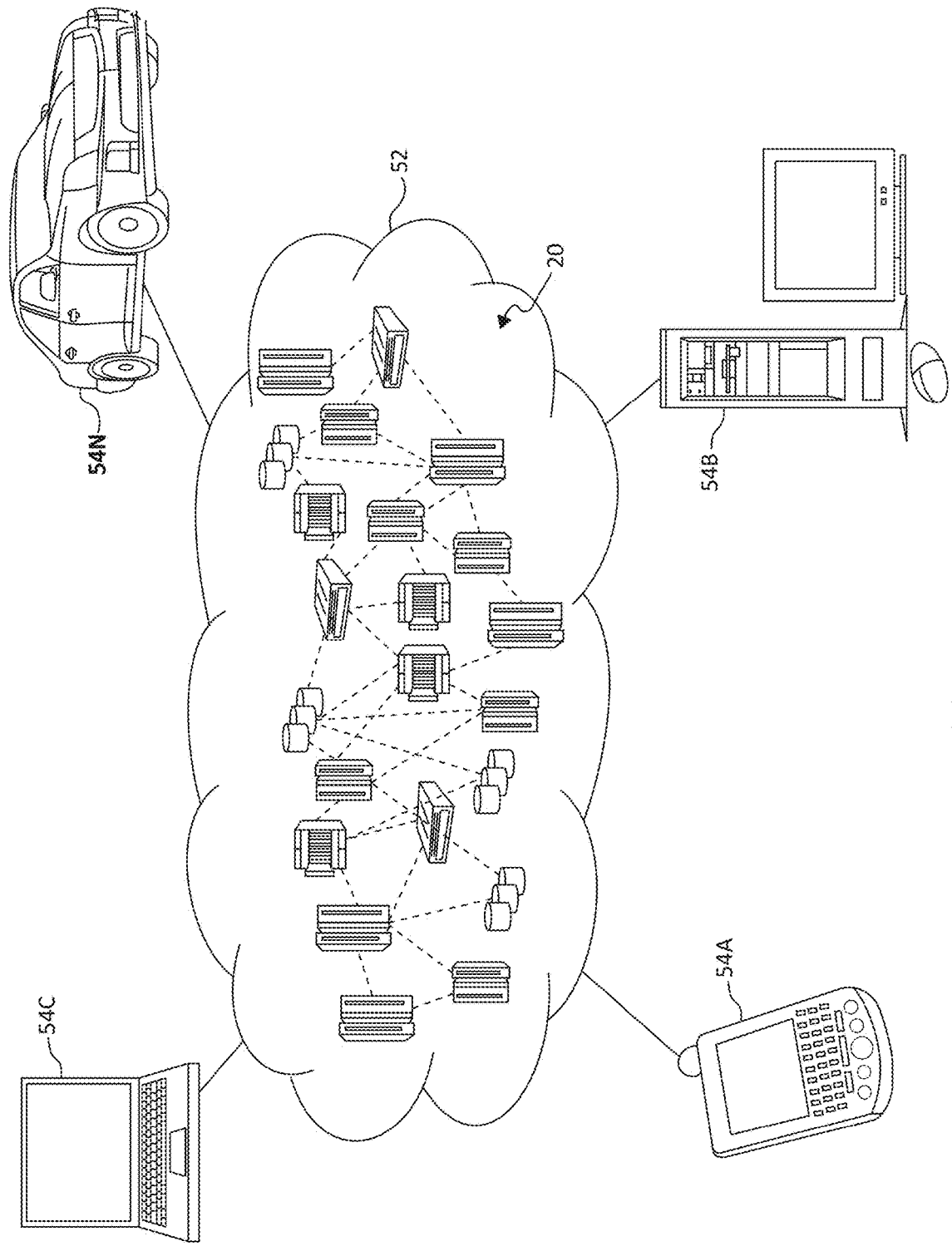
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
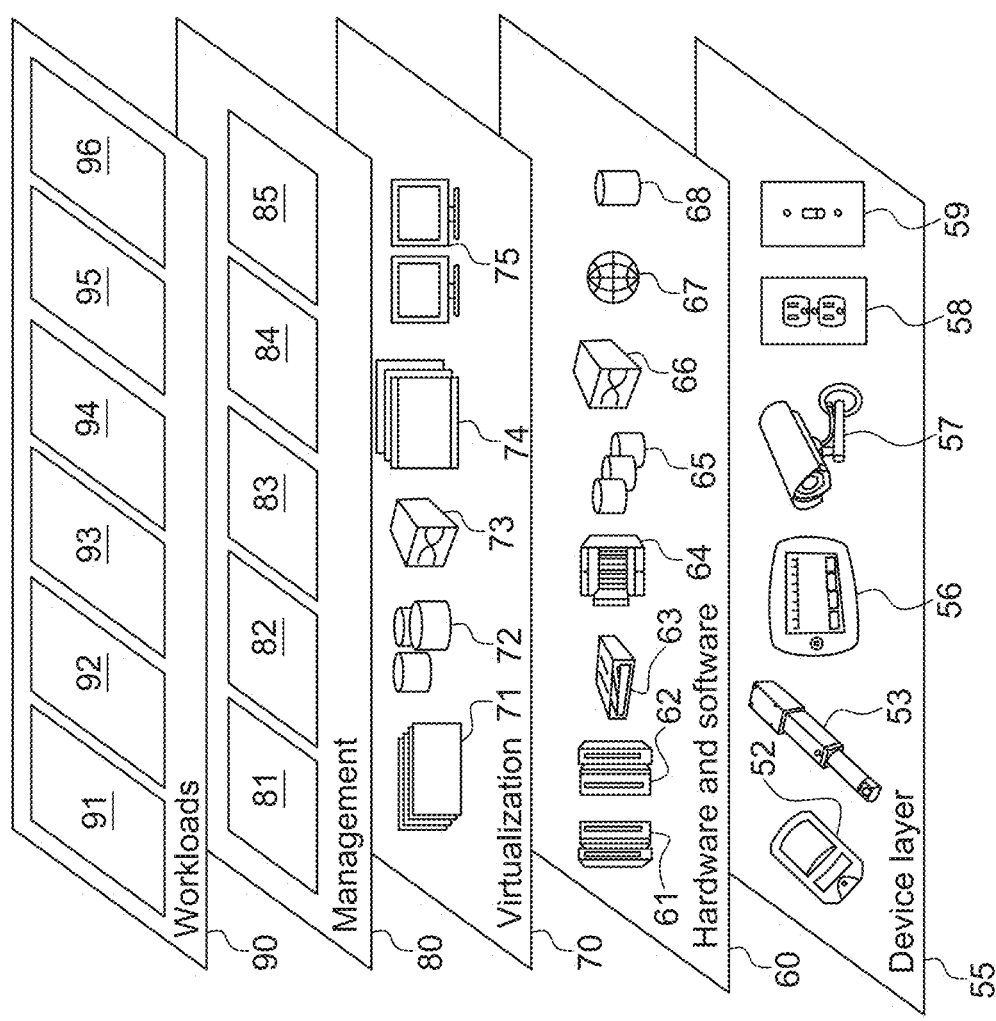
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various motion anticipation and actuation workloads and functions 96. In addition, motion anticipation and actuation workloads and functions 96 may include such operations as data analysis (including data collection and processing from various sensors). One of ordinary skill in the art will appreciate that the motion anticipation and actuation workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanism of the present invention provides a solution to optimize seating space in a group seating arrangement in a moving or stationary object. An optimized seating arrangement in the group seating arrangement, having one or more adjustable seats, may be determined according to the one or more seating preferences and constraints. A user is enabled to select the optimized seating arrangement via a graphical user interface (GUI) such that the one or more adjustable seats in the group seating arrangement are dynamically adjusted according to the optimized seating arrangement and user selection.

For example, the seating space optimization may be solved by one or more greedy algorithms, and/or constraint optimization problem solvers. For example, one or more seating preferences and constraints of passengers may include requirements of being seated together, an aisle/window seat, a front, middle, or rear/back seat, safety regulations, and the like. A passenger may provide a requested adjustment value of the seat ranging [−M, M], where M is a maximum size of the seat movement. Using these preferences and constraints, the seating space optimization operation may provide each passenger with an optimized seat according to each passengers' preferences and constraints. The seating space optimization may provide an actual adjustment value of each seat. The seating space optimization calculation may be a function such as, for example:

$$\text{Minimize} \Sigma_i w_i |Rav_i - Aav_i| \quad (1),$$

where $w_i$ is the weight that reflects how much money user A pays or receives, $Rav_i$ is the requested adjustment value of user i, and $Aav_i$ is the actual adjustment value of user i. Moreover, the seating space optimization may be employed at one or more different times such as, for example, option 1) at the conclusion of each seat being purchased or sold. In option 2) the seating space optimization may be determined a) at multiples times as more users secure or book seating tickets, b) each time a user purchases or sells a seat, or c) at an intermediate or selected time period to at least secure a partial commitment from a user according to the intermediary seating space optimization. Additionally, monetary refunds, credits, or savings may be issued at the time of use and/or applied to future use. The monetary refunds, credits, or savings may also be employed for a user at a next or subsequent seating space optimization operation for future travel.

Figure 4:
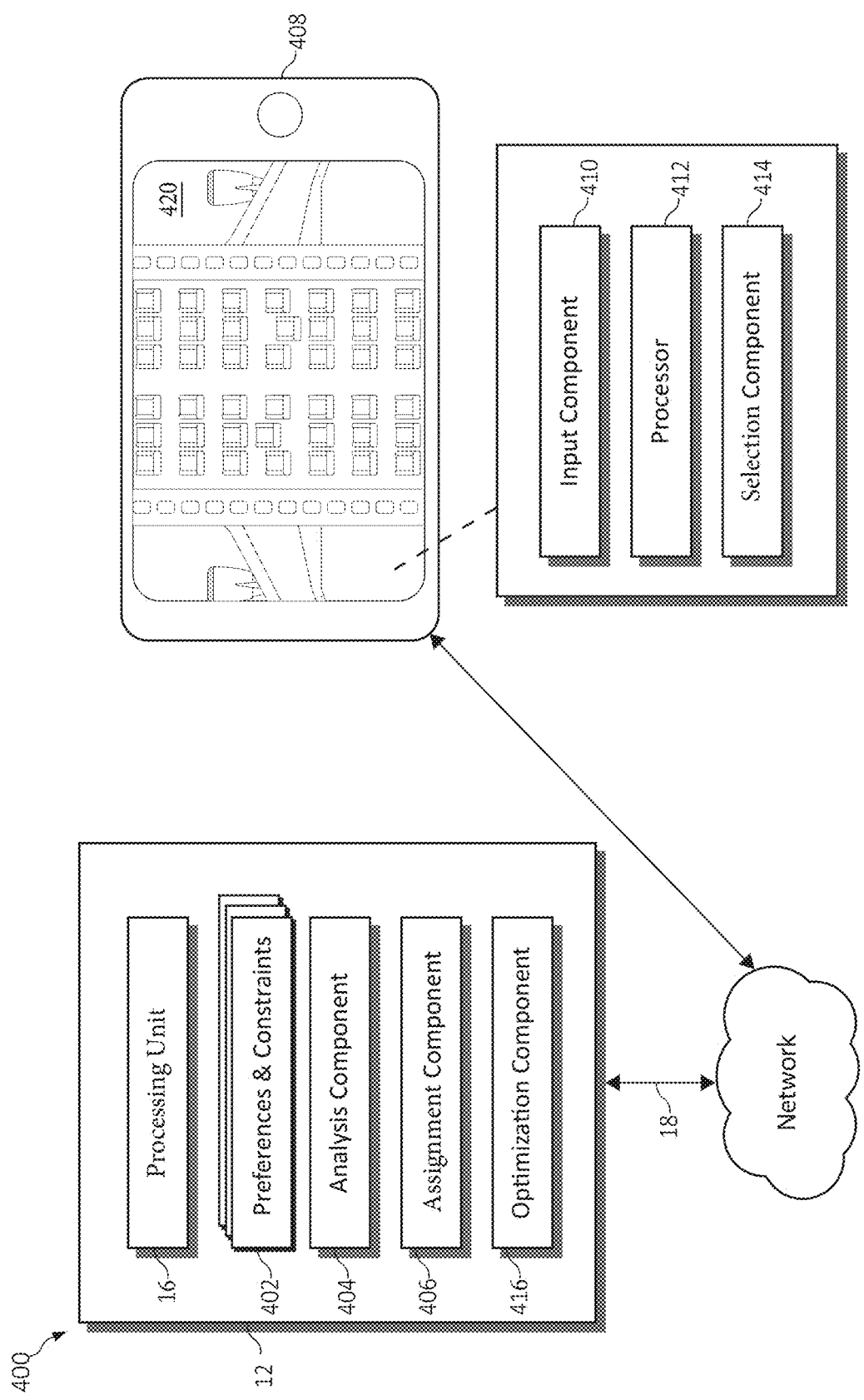
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, each of the devices, components, modules, and/or functions described in FIGS. 1-3 may also apply to the devices, components, modules, and functions of FIG. 4. Also, one or more of the operations and steps of FIGS. 1-3 may also be included in one or more operations or actions of FIG. 4. Computer system/server 12 is again shown, which may incorporate processing unit 16 to perform various computational, data processing and other functionality in accordance with various aspects of the present invention. A database of preferences and constraints (e.g., a knowledge domain or ontology) 402 is shown, along with an analysis component 404, an assignment component 406, and an optimization component 416. That is, one or more preferences and constraints may be received or collected from a user or mobile or stationary objects. The preferences and constraints may also be learned via a machine learning operation in relation to received feedback from a user or mobile or stationary objects. The preferences and constraints may also be stored with a keyword dictionary or ontology (e.g., a lexical database ontology), which may be associated with the central server, the cloud computing network, the local area network server, and/or the computing system of the IoT devices including an image capturing device.

FIG. 4's components 400 as shown may also include a computing device 408. In one aspect, the computing device 408 may include a smartphone, a tablet, computers, handheld devices, an internet of things (IoT) device, and the like. The computing device 408 may be connected via communication channels (e.g., bus 18) through the network to the computer system/server 12 as shown. In one exemplary embodiment, the computing device 408 may connect through a local wireless network through the Internet to the computer system/server 12 to provide, send and/or receive information and/or instructions to or from the computer system/server 12.

The computing device 408 may incorporate additional functional components 400 such as the depicted input component 410, processor 412, and selection component 414 (e.g., seat optimization selection component). Here again, the use of an input component 410 and selection component 414 are merely for illustrative convenience as a variety of functional components 400 may be integrated into the computing device 408 to accomplish specific functionality to further the mechanisms of the illustrated embodiments. The computing device 408 may provide an interactive graphical user interface (GUI) 420.

Input component 410 may, in one embodiment, serve to send or receive one or more preferences and/or constraints. For example, a user may select or input one or more preferences and/or constraints, purchase or sell a seat having more or less seating space via the input component 410, and input commands (e.g., text and/or command inputs) into a touch screen (e.g., the GUI 420) of the computing device 408. The input component 410 may also receive a command to communicate preferences, constraints, and/or optimized seating to the computer system/server 12. A variety of input data may pass through the input component 410 to be processed by the computer system/server 12.

In similar fashion, the selection component 414 may function for selecting the preferences, constraints, and/or optimized seating on the computing device 408 for communicating back to the computer system/server 12. The computer system/server 12 may provide the selection component 414 on the computing device 408.

The selection component 414 may provide a slider, a menu (e.g., drop-down menu), or other type of input filed (using the input component 410) to enable a user to define an increase or decrease in desired seating space (e.g., increased leg room or decreased leg room) and/or select a seating arrangement. The selection component 414 may query or provide a menu option to enable a user to select, determine, provide, update, define, change one or more preferences, constraints, conditions, pricing threshold, and/or provide other configurations and ontological data in association with selecting an optimized seating selection. For example, a menu option displaying a menu and/or list of a variety of preferences and/or constraints and/or optimized seating selections via the GUI 420 on the computing device 408 and the selection component 414 may be used to select the preferences, constraints, and/or optimized seating. This functionality may be provided by the GUI 420 on the computing device 408, which provides information to/from the computer system/server 12 or receives input and/or selection data from the user.

In short, the selection component 414 enables a user to purchase a dynamically adjustable seat having an increased amount of seating space (e.g., increased leg room) or a decreased amount of seating space (e.g., reduced leg room). The selection component 414 enables a user to sell or exchange a dynamically adjustable seat having an increased amount of seating space (e.g., increased leg room) or a decreased amount of seating space (e.g., reduced leg room).

As one of ordinary skill in the art will appreciate, the depiction of the various functional units in computer system/server 12 is for purposes of illustration, as the functional units may be located within computer system/server 12 or elsewhere within and/or between distributed computing components.

In one aspect, the preferences and constraints component 402 may include data stored, learned (e.g., via machine learning), or received (from computing device 408) for each user relating to health issues and considerations (e.g., restless leg syndrome), physical dimensions of a user (e.g., height and weight), financial constraints of a user (e.g., a maximum or minimum threshold amount a user will spend on a ticket providing more or less seating space), ticket costs, requirements for one or more family members to sit together, and preference and willingness of a user to buy or sell additional seating space (e.g., extra leg room). The preferences and constraints component 402 may include data relating to physical dimensions of each seat of a mobile or stationary object (e.g., an airplane, train, theater, a conference center, etc.), movement and adjustment capabilities of each seat, a seating style or arrangement in the mobile or the stationary objects, categories or classifications of seating (e.g., first class seats in an airline, business class seating, general seating class, etc.), or other seating data. The preferences and constraints may include a selected location or preference of a user for a seat in relation to other interests, preferences, or priorities (e.g., an aisle seat, a window seat, a seat having greater proximity to an exit or restroom facility, etc.).

An optimization component 416 may dynamically determine or compute an optimized seating arrangement in a group seating arrangement (e.g., a seating space optimization for the group seating arrangement), having one or more adjustable seats, according to the one or more seating preferences and constraints. In one aspect, the optimizing seating space operations (or "seating space optimization") performed by the optimization component 416 may include offering a user to select an adjustable seat according to one or more seating preferences and constraints. The seating space optimization process may take into account data from a variety of stored and real time sources, such as maps, mobile or stationary object seating designs (e.g., an airplane or theater seating arrangement), historical data, pricing relating to one or more preferences and constraints, and data gathered from the user from various integrated computing systems, among other sources. The optimization component 416 may undergo various data analytics functions associated with the preferences and constraints component 402 to identify and/or interpret an optimal seating arrangement for each user. For example, the optimization component 416 may take into consideration that user A is over 6 feet in height, is traveling via airplane with one family member, prefers an aisle seat, and sets a threshold price of "X" as the amount the user will pay for a seat. Accordingly, the optimization component 416 determines one or more optimal seating options of the group seating arrangement of the airplane according to each of the preferences.

Thus, the optimization component 416 may display and provide to the user (which may be via GUI 420 of the computing device 408), a final calculation and/or ticket cost according to the optimized seating space operation. Additionally, the optimization component 416 may provide one or more notifications (e.g., telephone call, email, text message, social media post, etc.) indicating various costs and/or cost savings according to the optimized seating space operation.

In other embodiments, the optimization component 416 may also determine an economic cost and/or benefit of adjustments to one or more seats in a group seating environment.

In conjunction with the preferences and constraints component 402, an assignment component 406 may assign a dynamically adjustable seat to a user, having purchased a seat having more seating space compared to other seats, to a seat having an increased amount of seating space (e.g., increased leg room). The assignment component 406 may assign a dynamically adjustable seat to a user, having sold a seat having more seating space compared to other seats, to a seat having a decreased amount of seating space (e.g., reduced leg room).

In an additional aspect, the analysis component 404 and assignment component 406 of the computer system/server 12 may work in concert with processing unit 16 to accomplish various aspects of the present invention. For example, analysis component 404 may undergo various data analytics functions associated with the preferences and constraints component 402 to associate and determine which optimized seating arrangement should be assigned to each user.

The analysis component 404 may analyze each physical property associated with the user and/or mobile or stationary object. The analysis component 404 may estimate one or more optimized seating space arrangements according to the analyzed physical properties associated with the user and/or mobile or stationary object. The analysis component 404 may also query the computing device 408 (e.g., user) for additional data supplanting historical data such as, for example, previous preferences and constraints provided from the user. The analysis component 404 may be a machine learning component that may be initialized to learn one or more preferences and constraints for each user and also learn the one or more preferences and constraints as each one pertains to various mobile objects or stationary objects. For example, the machine learning component may collect feedback and analyze the data to learn that, when traveling via airplane, user "A" prefers more leg room and is willing to set a maximum price threshold for securing the additional leg room when traveling on business, but learns that user A's maximum price threshold is reduced to a reduced price threshold when traveling for personal reasons (e.g., non-business travel). As one of ordinary skill in the art will appreciate, the assignment component 406, the analysis component 404, and the optimization component 416 may implement mathematical modeling or other data processing technologies to carry out the various mechanisms of the illustrated embodiments. For example, the assignment component 406, the analysis component 404, and the optimization component 416 may implement computations or calculations performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Turning to FIGS. 5A-5D, depicted are various operations that may be employed and used on a graphical user interface such as, for example, GUI 420 of computing device 408 of FIG. 4. In one aspect, each of the devices, components, modules, and/or functions described in FIGS. 1-4 may also apply to the devices, components, modules, and functions of FIGS. 5A-5D.

Figures 5A, 5B, 5C, 5D:
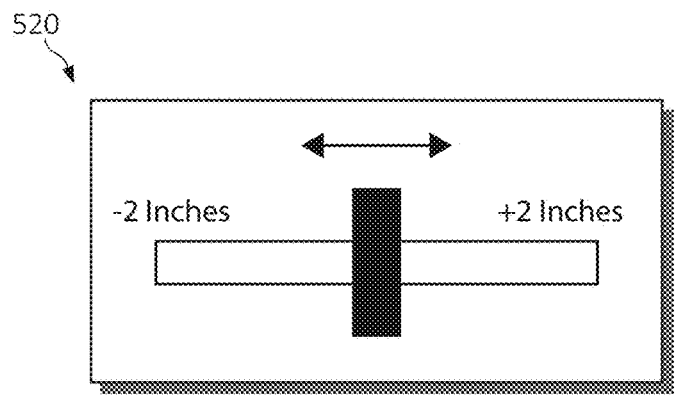
FIG. 5A is a diagram depicting price calculation in accordance with aspects of the present invention.
FIG. 5B is a diagram depicting selecting seating space options in accordance with aspects of the present invention.
FIG. 5C is a diagram depicting user preference input for selecting a seating space option in accordance with aspects of the present invention.
FIG. 5D is a diagram depicting a menu in a graphical user interface ("GUI") in accordance with aspects of the present invention.

FIG. 5A depicts a price calculation 510 determined according to a seating space optimization that may be displayed on a computing device application (e.g., GUI interface of computing device 408) or website. As illustrated, an increased cost or reward for providing additional or increased seating space (e.g., leg room) may be a function of additional or decreased seating space (e.g., leg room).

FIG. 5B depicts selecting seating space options using a "slider" 520 (e.g., a selection field such as input component 410 and/or selection component 414 of FIG. 4) that may also be displayed or communicated for display to a computing device application (e.g., GUI interface 420 of computing device 408) or website. The slider 520 may have a fixed or adjustable size so as to accommodate the GUI 420 of the computing device 408 of FIG. 4. Thus, a user may interact with the slider and select or choose an increased amount or decreased amount of additional seating space according to a user's preferences and constraints.

FIG. 5C depicts a user preference input 530 (e.g., a selection field such as input component 410 and/or selection component 414 of FIG. 4) for selecting a seating space option that may also be displayed, or communicated for display, to a computing device application (e.g., GUI 420 of computing device 408 of FIG. 4) or website. A user may interactively engage the user preference input and enter an increased amount or decreased amount of additional seating space (e.g., increasing the leg room by 1.5 inches).

FIG. 5D depicts a menu 540 (e.g., a selection field such as input component 410 and/or selection component 414 of FIG. 4) that may also be displayed, or communicated for display, to a computing device application (e.g., GUI 420 of computing device 408 of FIG. 4) or website. The menu may be a drop-down menu that may be displayed to a user to select an increased amount or decreased amount of additional seating space. The menu 540 may be dynamically updated and adapted according to each preference or constraint for each user. For example, the menu 540 may display incremental increases or decreases for selecting leg space using increments of one inch per option (e.g., −2, −1, +1, +2, and +3 inches). However, the menu 540 may dynamically change or display alternative options for an alternative user such as, for example, incremental increases or decreases for selecting leg space using increments of two inches per option (e.g., −4, −2, +2, +4, and +6 inches).

Turning now to FIGS. 6A-6B, diagram 610 depicts an anticipated/actual motion of an adjustable seating surface and diagram 620 depicts an anticipated/actual motion of an adjustable seat. In one aspect, devices, components, modules, and/or functions described in FIGS. 1-5A-5B may be employed in FIGS. 6A-6B.

As illustrated in FIG. 6A, adjustable seat 610 illustrates a forward and backward translating seating surface. The seating surface may actuate automatically by an electric motor, pneumatic or hydraulic system. FIG. 6B, illustrates adjustable seat 620 having the ability to actuate automatically via a connection with a floor or ground. The adjustable seat 620 may move forward, backwards (and/or laterally) and actuate automatically by an electric motor, pneumatic or hydraulic system.

Thus, upon a user selecting an optimized seating arrangement via a GUI (see GUI 420 of FIG. 4), the adjustable seat 610 and/or the adjustable seat 620 in the group seating arrangement may be dynamically adjusted according to the optimized seating arrangement and user selection. In one aspect, a signal is sent to a computing system responsible for the control, operation, and/or management of the adjustable seat 610 and/or the adjustable seat 620.

Figure 7:
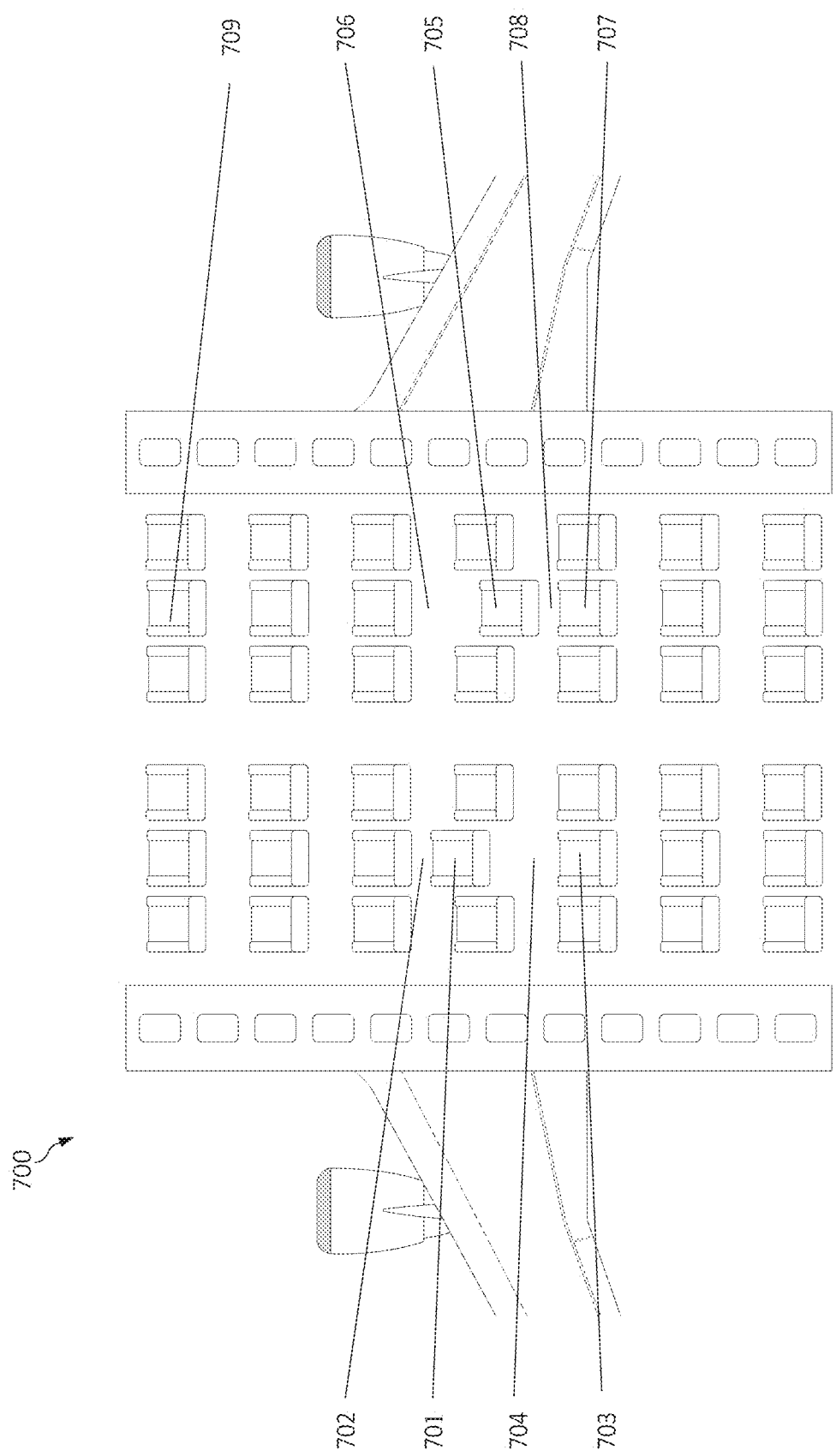
FIG. 7 is a diagram depicting a group seating arrangement in accordance with aspects of the present invention.

FIG. 7, following, illustrates one embodiment of a group seating arrangement of a mobile or stationary object (e.g., an airplane or theater), that may be implemented using devices, components, modules, and/or functions described in FIGS. 1-6A-6B.

In the context of the mechanisms of the illustrated embodiments, and as previously described, FIG. 7 depicts an example schematic of a group seating arrangement in an airplane 700. One or more seats can be moved forward, backward, and/or laterally (if possible) as described in FIGS. 6A-6B. The airplane 700 illustrates an example seat 701 having decreased seating space 702 (e.g., reduced leg space) and an alternative seat 705 having increased seating space 706 (e.g., increased leg space).

In one aspect of the illustrated example, seat 701 has sold or exchanged at least a partial amount of seating space 702 causing the seating space 702 to be reduced. Seat 703 illustrates a seat being in a standard position (e.g., a current configuration of airplane 700 without any adjustments). However, seat 703 now has an increased amount of seating space 704 because seat 701 has moved or actuated in a forward direction away from seat 703 so as to reduce seating space 702.

Also, alternative seat 705 has purchased at least a partial amount of seating space 706 causing the seating space 706 to be increased (e.g., additional leg space has been purchased).

Seat 707 illustrates a seat being in a standard position (e.g., a current configuration of airplane 700 without any adjustments). However, seat 707 now has a decreased amount of seating space 708 because seat 705 has moved or actuated in a rearward/backwards direction toward seat 707 so as to reduce seating space 708 of seat 707 and increase seating space 706 for seat 705.

Again, seat 709 illustrates a standardized seating space prior to any optimized seating arrangement operations or adjustments and is provided herein for illustrative purposes.

Figure 8:
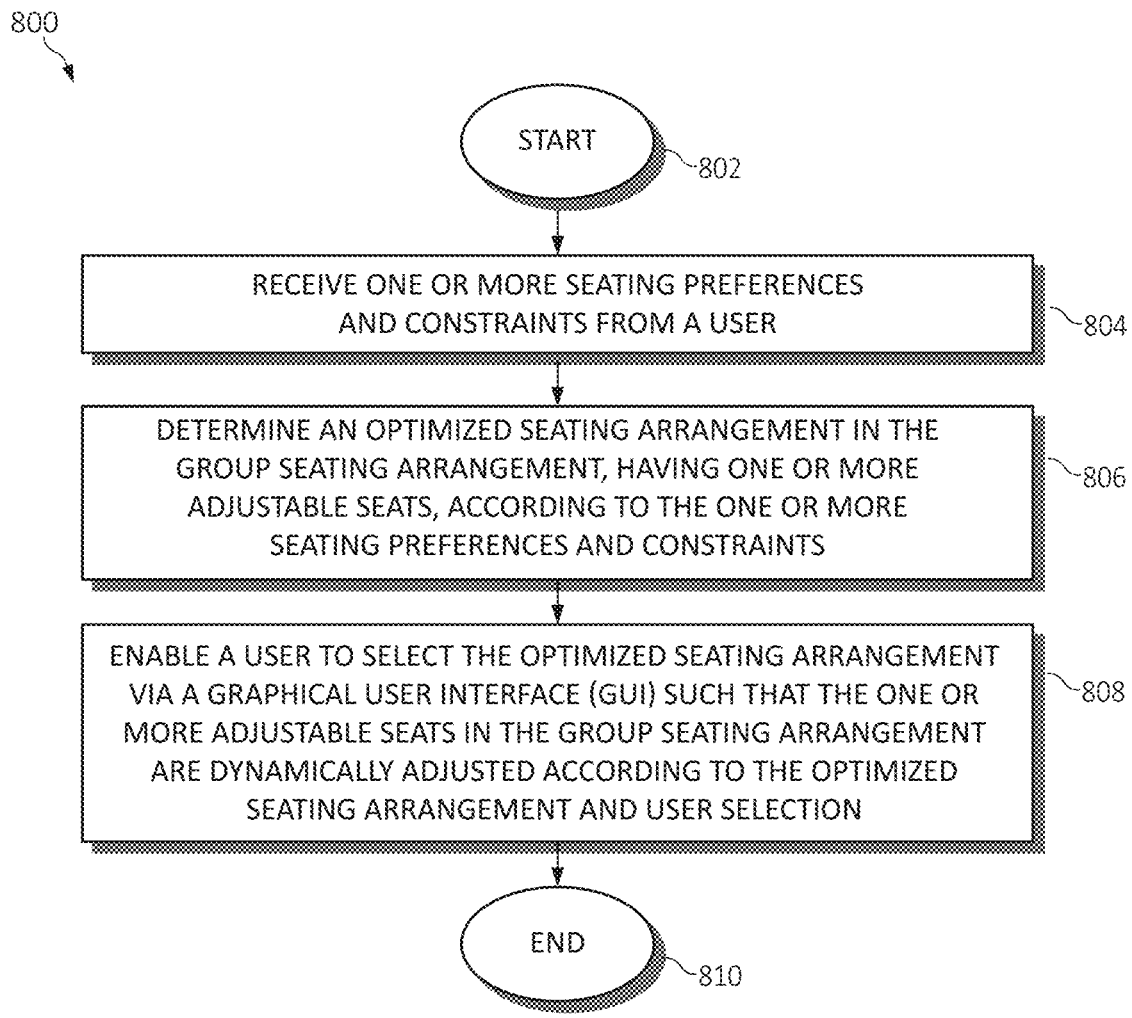
FIG. 8 is an additional flowchart diagram depicting an exemplary method for optimizing seating space in a group seating arrangement in a moving or stationary object, again in which various aspects of the present invention may be implemented.

Turning now to FIG. 8, a method 800 for optimizing seating space in a group seating arrangement by a processor is depicted. The functionality 800 may be implemented as a method executed as instructions on a machine, where the instructions are included on at least one computer readable medium or one non-transitory machine-readable storage medium. The functionality 800 may start in block 802. One or more seating preferences and constraints from a user may be received, as in block 804. An optimized seating arrangement in the group seating arrangement, having one or more adjustable seats, may be determined according to the one or more seating preferences and constraints, as in block 806. A user is enabled to select the optimized seating arrangement via a graphical user interface (GUI) such that the one or more adjustable seats in the group seating arrangement are dynamically adjusted according to the optimized seating arrangement and user selection, as in block 808. The functionality 800 may end in block 810.

In one aspect, in conjunction with and/or as part of at least one block of FIG. 8, the operations of method 800 may include each of the following. The operations of method 800 may define the optimized seating arrangement according to the one or more seating preferences and constraints, and/or define the optimized seating arrangement as a seating arrangement requiring the one or more adjustable seats to adjust forwards, backwards, sideways, or a combination thereof to accommodate the one or more seating preferences and constraints. The operations of method 800 may also include defining a selected amount of seating space in relation to the one or more adjustable seats using a natural language processing (NLP) operation (e.g., text based, audio, and/or video). For example, a user may be enabled to audibly state "I need 5 additional inches of leg room."

The optimized seating arrangement may be determined according to a defined minimum seating price, a maximum seating price, or adjustable seating price the user selects in relation to the one or more seating preferences and constraints. The user may be assigned to the one or more adjustable seats according to the optimized seating arrangement and the user selection. A machine learning component may be initialized to learn and define the one or more seating preferences and constraints from the user. A signal may be communicated to one or more adjustable seats to dynamically adjust based on the optimized seating arrangement and the user selection, wherein the group seating arrangement includes a vehicle, an aircraft, a train, a boat, a physical structure, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for optimizing seating space in a group seating arrangement, comprising:
   receiving, by the processor, one or more seating preferences and constraints from a user;
   determining, by the processor, an optimized seating arrangement in the group seating arrangement, having one or more adjustable seats, according to the one or more seating preferences and constraints;
   enabling the user to select, on a seating map, the optimized seating arrangement via a graphical user interface (GUI) such that the one or more adjustable seats in the group seating arrangement are dynamically adjusted according to the optimized seating arrangement and user selection; wherein the user selection includes selecting an amount of legroom, from a plurality of predefined incremental legroom selection options, for a seat of the one or more adjustable seats prior to a selection or assignment of the seat of the one or more adjustable seats for the user;
   responsive to receiving the input of the selection of the amount of legroom, regenerating the seating map, by the processor, according to the dynamically adjusted optimized seating arrangement and the user selection; wherein each of the one or more adjustable seats are spatially fixed within the seating map prior and subsequent to receiving the user selection notwithstanding each of the one or more adjustable seats dynamically adjust a predetermined amount within a horizontal plane such that regenerating the seating map includes computing and displaying, to an alternative user during the user selection of an alternative seat of the one or more adjustable seats in a vicinity of the seat in the optimized seating arrangement, revised available legroom options of the plurality of predefined incremental legroom selection options selectable by the alternative user prior to the selection or assignment of the alternative seat to the alternative user according to the selected amount of legroom for the one or more adjustable seats received from the user selection; and
   causing, by the processor, the one or more adjustable seats to automatically adjust according to a control signal sent from the processor to actuate an electric motor, pneumatic, or hydraulic system of the one or more adjustable seats; wherein the automatic adjustment is based on the optimized seating arrangement and the user selection and includes automatically adjusting the seat and the alternative seat of the one or more adjustable seats within the vicinity of the seat in the optimized seating arrangement according to the selected amount of legroom for the seat by the user and a remaining one of the revised available legroom options one of the plurality of predefined incremental legroom selection options by the alternative user.

2. The method of claim 1, further including defining the optimized seating arrangement according to the one or more seating preferences and constraints.

3. The method of claim 1, further including defining the optimized seating arrangement as a seating arrangement requiring the one or more adjustable seats to adjust forwards, backwards, sideways, or a combination thereof to accommodate the one or more seating preferences and constraints.

4. The method of claim 1, further including determining the optimized seating arrangement according to a defined minimum seating price, a maximum seating price, or adjustable seating price the user selects in relation to the one or more seating preferences and constraints.

5. The method of claim 1, further including:
   assigning the user to the one or more adjustable seats according to the optimized seating arrangement and the user selection; or
   defining a selected amount of seating space in relation to the one or more adjustable seats using a natural language processing (NLP) operation.

6. The method of claim 1, further including initializing a machine learning component to learn and define the one or more seating preferences and constraints from the user.

7. The method of claim 1, wherein the group seating arrangement includes a vehicle, an aircraft, a train, a boat, a physical structure, or a combination thereof.

8. A system for optimizing seating space in a group seating arrangement in a computing environment, comprising:
   one or more computers with executable instructions that when executed cause the system to:
      receive, by a processor executing the executable instructions, one or more seating preferences and constraints from a user;
      determine, by the processor, an optimized seating arrangement in the group seating arrangement, having one or more adjustable seats, according to the one or more seating preferences and constraints;
      enable the user to select, on a seating map, the optimized seating arrangement via a graphical user interface (GUI) such that the one or more adjustable seats in the group seating arrangement are dynamically adjusted according to the optimized seating arrangement and user selection; wherein the user selection includes selecting an amount of legroom, from a plurality of predefined incremental legroom selection options, for a seat of the one or more adjustable seats prior to a selection or assignment of the seat of the one or more adjustable seats for the user;
      responsive to receiving the input of the selection of the amount of legroom, regenerate the seating map, by the processor, according to the dynamically adjusted optimized seating arrangement and the user selection; wherein each of the one or more adjustable seats are spatially fixed within the seating map prior and subsequent to receiving the user selection notwithstanding each of the one or more adjustable seats dynamically adjust a predetermined amount within a horizontal plane such that regenerating the seating map includes computing and displaying, to an alternative user during the user selection of an alternative seat of the one or more adjustable seats in a vicinity of the seat in the optimized seating arrangement, revised available legroom options of the plurality of predefined incremental legroom selection options selectable by the alternative user prior to the selection or assignment of the alternative seat to the alternative user according to the selected amount of legroom for the one or more adjustable seats received from the user selection; and cause, by the processor, the one or more adjustable seats to automatically adjust according to a control signal sent from the processor to actuate an electric motor, pneumatic, or hydraulic system of the one or more adjustable seats; wherein the automatic adjustment is based on the optimized seating arrangement and the user selection and includes automatically adjusting the seat and the alternative seat of the one or more adjustable seats within the vicinity of the seat in the optimized seating arrangement according to the selected amount of legroom for the seat by the user and a remaining one of the revised available legroom options one of the plurality of predefined incremental legroom selection options by the alternative user.

9. The system of claim 8, wherein the executable instructions define the optimized seating arrangement according to the one or more seating preferences and constraints.

10. The system of claim 8, wherein the executable instructions define the optimized seating arrangement as a seating arrangement requiring the one or more adjustable seats to adjust forwards, backwards, sideways, or a combination thereof to accommodate the one or more seating preferences and constraints.

11. The system of claim 8, wherein the executable instructions determine the optimized seating arrangement according to a defined minimum seating price, a maximum seating price, or adjustable seating price the user selects in relation to the one or more seating preferences and constraints.

12. The system of claim 8, wherein the executable instructions:

assign the user to the one or more adjustable seats according to the optimized seating arrangement and the user selection; or define a selected amount of seating space in relation to the one or more adjustable seats using a natural language processing (NLP) operation.

13. The system of claim 8, wherein the executable instructions initialize a machine learning component to learn and define the one or more seating preferences and constraints from the user.

14. The system of claim 8, wherein the group seating arrangement includes a vehicle, an aircraft, a train, a boat, a physical structure, or a combination thereof.

15. A computer program product for, by a processor, optimizing seating space in a group seating arrangement, the computer program product comprising a non-transitory computer-readable storage medium having computer-readable program code portions stored therein, the computer-readable program code portions comprising:

an executable portion that receives, by the processor, one or more seating preferences and constraints from a user;

an executable portion that determines, by the processor, an optimized seating arrangement in the group seating arrangement, having one or more adjustable seats, according to the one or more seating preferences and constraints;

an executable portion that enables the user to select, on a seating map, the optimized seating arrangement via a graphical user interface (GUI) such that the one or more adjustable seats in the group seating arrangement are dynamically adjusted according to the optimized seating arrangement and user selection; wherein the user selection includes selecting an amount of legroom, from a plurality of predefined incremental legroom selection options, for a seat of the one or more adjustable seats prior to a selection or assignment of the seat of the one or more adjustable seats for the user;

an executable portion that, responsive to receiving the input of the selection of the amount of legroom, regenerates the seating map, by the processor, according to the dynamically adjusted optimized seating arrangement and the user selection; wherein each of the one or more adjustable seats are spatially fixed within the seating map prior and subsequent to receiving the user selection notwithstanding each of the one or more adjustable seats dynamically adjust a predetermined amount within a horizontal plane such that regenerating the seating map includes computing and displaying, to an alternative user during the user selection of an alternative seat of the one or more adjustable seats in a vicinity of the seat in the optimized seating arrangement, revised available legroom options of the plurality of predefined incremental legroom selection options selectable by the alternative user prior to the selection or assignment of the alternative seat to the alternative user according to the selected amount of legroom for the one or more adjustable seats received from the user selection; and an executable portion that causes, by the processor, the one or more adjustable seats to automatically adjust according to a control signal sent from the processor to actuate an electric motor, pneumatic, or hydraulic system of the one or more adjustable seats; wherein the automatic adjustment is based on the optimized seating arrangement and the user selection and includes automatically adjusting the seat and the alternative seat of the one or more adjustable seats within the vicinity of the seat in the optimized seating arrangement according to the selected amount of legroom for the seat by the user and a remaining one of the revised available legroom options one of the plurality of predefined incremental legroom selection options by the alternative user.

16. The computer program product of claim 15, further including an executable portion that:

defines the optimized seating arrangement according to the one or more seating preferences and constraints; and initializes a machine learning component to learn and define the one or more seating preferences and constraints from the user.

17. The computer program product of claim 15, further including an executable portion that defines the optimized seating arrangement as a seating arrangement requiring the one or more adjustable seats to adjust forwards, backwards, sideways, or a combination thereof to accommodate the one or more seating preferences and constraints.

18. The computer program product of claim 15, further including an executable portion that determines the optimized seating arrangement according to a defined minimum seating price, a maximum seating price, or adjustable seating price the user selects in relation to the one or more seating preferences and constraints.

19. The computer program product of claim 15, further including an executable portion that:

assigns the user to the one or more adjustable seats according to the optimized seating arrangement and the user selection; or defines a selected amount of seating space in relation to the one or more adjustable seats using a natural language processing (NLP) operation.

20. The computer program product of claim 15, wherein the group seating arrangement includes a vehicle, an aircraft, a train, a boat, a physical structure, or a combination thereof.

* * * * *